United States Patent
Liu et al.

(10) Patent No.: US 10,618,121 B2
(45) Date of Patent: Apr. 14, 2020

(54) DEVICE FOR MILLING WHEEL WINDOW BURRS ON LINE

(71) Applicant: CITIC Dicastal CO., LTD., Qinhuangdao, Hebei (CN)

(72) Inventors: Weidong Liu, Qinhuangdao (CN); Fengyan Liu, Qinhuangdao (CN); Jinling Yang, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 16/116,170

(22) Filed: Aug. 29, 2018

(65) Prior Publication Data
US 2019/0061020 A1 Feb. 28, 2019

(30) Foreign Application Priority Data
Aug. 31, 2017 (CN) .......................... 2017 1 0776238

(51) Int. Cl.
*B23B 35/00* (2006.01)
*B23B 39/22* (2006.01)
*B23C 3/12* (2006.01)

(52) U.S. Cl.
CPC ................ *B23C 3/12* (2013.01); *B23B 35/00* (2013.01); *B23B 39/22* (2013.01); *B23B 2215/08* (2013.01); *B23C 2215/085* (2013.01)

(58) Field of Classification Search
CPC ............ B23B 2215/08; B23B 2220/32; B23C 2215/085; Y10T 408/44; Y10T 409/303976
See application file for complete search history.

(56) References Cited

U.S. PATENT DOCUMENTS

| 2,657,063 A * | 10/1953 | Trosch ...................... B23B 5/28 279/71 |
| 4,866,834 A * | 9/1989 | Winkler .................. B23B 41/00 483/1 |
| 8,172,489 B2 * | 5/2012 | Prust ................. B23B 31/16275 269/134 |
| 2001/0039732 A1 * | 11/2001 | Smyth ..................... B23P 15/00 29/894.35 |
| 2004/0170769 A1 * | 9/2004 | Gatton ...................... B23B 5/02 427/402 |
| 2005/0120557 A1 * | 6/2005 | Gatton ...................... B23B 5/02 29/894.32 |

(Continued)

FOREIGN PATENT DOCUMENTS

CN 104162703 A 11/2014
CN 105922801 A 9/2016
(Continued)

*Primary Examiner* — Nicole N Ramos
(74) *Attorney, Agent, or Firm* — Cooper Legal Group, LLC

(57) ABSTRACT

The disclosure provides a device for milling wheel window burrs on line, which is composed of a frame, a base plate, a lifting cylinder, a first bracket, a bearing base, a linear bearing, a mounting plate, a guide shaft, a lifting shaft, a first servo motor, a first synchronous pulley, a connecting plate and the like. The device comprises a lifting portion, in which the base plate is fixed on the frame, the mounting plate is fixed on the base plate via the first bracket, the bearing base and the lifting cylinder are fixed on the mounting plate, and the lifting shaft is mounted on the bearing base via the linear bearing.

2 Claims, 3 Drawing Sheets

(56) References Cited

U.S. PATENT DOCUMENTS

| | | | | |
|---|---|---|---|---|
| 2006/0042091 | A1* | 3/2006 | Luschei | B23B 1/00 |
| | | | | 29/894.35 |
| 2011/0068544 | A1* | 3/2011 | Prust | B23B 31/16275 |
| | | | | 279/4.02 |
| 2012/0073413 | A1* | 3/2012 | Len | B23B 5/00 |
| | | | | 82/104 |
| 2014/0271016 | A1* | 9/2014 | Chou | B23B 31/185 |
| | | | | 409/224 |
| 2016/0052067 | A1* | 2/2016 | Stricklen | B23B 39/161 |
| | | | | 408/1 BD |
| 2018/0071828 | A1* | 3/2018 | Sun | B23B 5/28 |

FOREIGN PATENT DOCUMENTS

| | | |
|---|---|---|
| CN | 105928476 A | 9/2016 |
| CN | 106004273 A | 10/2016 |
| CN | 208033751 U | 11/2018 |

\* cited by examiner

DEVICE FOR MILLING WHEEL WINDOW BURRS ON LINE

CROSS-REFERENCE TO RELATED APPLICATION

The present application claims benefit of Chinese Patent Application No. 201710776238.7, filed on Aug. 31, 2017, the contents of which are hereby incorporated by reference in its entirety.

BACKGROUND

During machining of an automobile wheel, it is extremely important to effectively remove burrs produced at a machined window. The removal effect should be ensured, because high removal efficiency can reduce the production cost. The conventional method of brushing burrs is to use a disc brush for wheels of the same size. Therefore, for mixed-line production enterprises, brushes need to be frequently replaced for different sizes of wheels, which seriously affects the production efficiency and increases the cost of brushing burrs.

SUMMARY

The present disclosure relates to a machining device, specifically to a device for milling wheel window burrs on line.

The object of the present disclosure is to provide a device for milling wheel window burrs on line.

In order to achieve the above object, the technical solution of the present disclosure is:

The present disclosure relates to a device for milling wheel window burrs on line, which is mainly composed of a frame, a base plate, a lifting cylinder, a first bracket, a bearing base, a linear bearing, a mounting plate, a guide shaft, a lifting shaft, a first servo motor, a first synchronous pulley, a connecting plate, a synchronous belt, a second synchronous pulley, a base, a first connecting shaft, a second servo motor, a first shaft sleeve, a lower end cover, a second connecting shaft, a second shaft sleeve, a cylinder, a first bearing, an end cover, a first gland, second bearings, a base plate, a flange plate, pins, springs, expansion flaps, a third connecting shaft, a guard, an expansion core, a third servo motor, a third shaft sleeve, a third bearing, a rotating shaft, a second gland, a milling cutter and a six-axis manipulator.

A lifting portion: the base plate is fixed on the frame, the mounting plate is fixed on the base plate via the first bracket, the bearing base and the lifting cylinder are fixed on the mounting plate, the lifting shaft is mounted on the bearing base via the linear bearing, the two ends of the lifting shaft are respectively connected with the connecting plate and an output shaft of the lifting cylinder, and the lifting cylinder drives the mounting plate to move up and down smoothly via the linear bearing;

A rotating portion: the first servo motor and the base are fixed on the connecting plate, the first shaft sleeve is mounted on the base via the first bearing and the end cover, the first synchronous pulley and the second synchronous pulley are respectively connected with the first connecting shaft and an output shaft of the first servo motor, and the synchronous belt is connected with the first synchronous pulley and the second synchronous pulley respectively;

A clamping expansion portion: the lower end cover, the gland and the base plate are fixed on the first shaft sleeve, the second servo motor is mounted on the lower end cover, the second shaft sleeve is mounted on the first shaft sleeve via two columns of second bearing and the gland, the cylinder is fixed inside the second shaft sleeve, an output end of the cylinder is connected with the second connecting shaft, the second servo motor is connected with the second shaft sleeve via the second connecting shaft, the expansion core is connected with the second shaft sleeve via the third connecting shaft, the expansion core, the third connecting shaft and the second shaft sleeve are circumferentially locked without relative rotation, the third connecting shaft and the second shaft sleeve can move axially relatively, the flange plate is fixed on the base plate, eight uniformly distributed T-shaped chutes are formed in the inner cavity of the flange plate and the base plate, the bottom surfaces of the eight expansion flaps are T-shaped structures formed respectively in one-to-one correspondence with the eight T-shaped chutes, the expansion flaps can smoothly and accurately slide in the chutes, the inner side walls of the expansion flaps are 15° inclined surfaces, and the two ends of the eight springs are respectively connected with the flange plate and the eight expansion flaps; the lateral surface of the expansion core comprises two groups of inclined surfaces uniformly spaced 15°, the number of each group of inclined surfaces is 8, the two inclined surfaces have a height difference, and the upper side walls of the two groups of inclined surfaces are intersected at tapered surfaces; when the expansion core is at the bottom under the co-action of the pulling force of the cylinder and the elasticity of the springs, the side walls of the expansion flaps are in contact with the tapered surfaces of the expansion core; the second servo motor drives the expansion core to rotate 22.5° via the second connecting shaft, the second shaft sleeve and the third connecting shaft, and the expansion flaps matched with the inclined surfaces can be switched between the inclined surfaces of the expansion core. The cylinder drives the third connecting shaft and the expansion core to move up and down, the eight expansion flaps move synchronously centripetally and centrifugally in the eight uniformly distributed T-shaped chutes formed in the inner cavity of the flange plate and the base plate through the cooperation of the inclined surfaces of the expansion flaps and the inclined surfaces of the expansion core, and the eight expansion flaps realize high-precision synchronous expansion and contraction functions; since the two groups of inclined surfaces spaced uniformly on the lateral surfaces of the expansion core have a height difference, when the second servo motor drives the expansion core to rotate 22.5°, the expansion flaps matched with the inclined surfaces are switched between the inclined surfaces of the expansion core, thus, the expansion and contraction diameters of the expansion flaps change in two different ranges, and eventually the expansion flaps achieve large-stroke expansion and contraction;

A milling portion: the third servo motor and the third shaft sleeve are fixed on the six-axis manipulator, the second gland and the third bearing enclose the rotating shaft inside the third shaft sleeve, the third servo motor is connected with the rotating shaft, and the milling cutter is fixed on the rotating shaft.

The base plate and the flange plate are provided with corresponding pin holes, and the locating pins are respectively connected with the pin holes of the base plate and the flange plate to ensure the assembly precision of the base plate and the flange plate.

In actual use, a wheel is transported to the working position of the device via a roller bed, compressed air is introduced, the lifting cylinder drives the clamping mechanism to rise, the flange surface of the wheel is in contact with the flange plate, and then the lifting cylinder drives the wheel to a designated position. A cylinder rod of the cylinder is in a contracted state, and under the action of the springs, the inclined surfaces of the expansion flaps are in contact with the upper tapered surfaces of the expansion core. According to the diameter of the center hole of the wheel, the first servo motor drives the expansion core to rotate a specific angle, so that the inclined surfaces of the expansion flaps are matched with the corresponding inclined surfaces of the expansion core; then the cylinder starts to work, and the cylinder overcomes the elasticity of the springs and drives the second connecting shaft and the expansion core to move up; and the inclined surfaces of the expansion flaps are matched with the inclined surfaces of the expansion core, the expansion flaps move synchronously outward in the eight uniformly distributed T-shaped chutes formed in the inner cavity of the flange plate and the base plate, finally, the expansion flaps contact the center hole of the wheel, and the positioning and expansion process of the wheel is completed. The third servo motor drives the milling cutter to rotate, and removes burrs along the edge of the wheel window according to a program previously input to the six-axis manipulator. So far, the removal of the wheel burrs is completed.

The device can meet the requirement for wheel hop detection, at the same time, has the characteristics of simple structure, convenient manufacture, stable performance and precision that can meet the machining requirement, and can meet the requirements of automatic production.

BRIEF DESCRIPTION OF DRAWINGS

The embodiments of the present disclosure will be described in detail below in combination with the accompanying drawings, in which:

FIG. 2A and FIG. 2B are structure diagrams of an expansion core in the device for milling wheel window burrs on line according to the present disclosure, in which FIG. 2A is a front view and FIG. 2B is a top view.

LIST OF REFERENCE SYMBOLS

Figure 1:
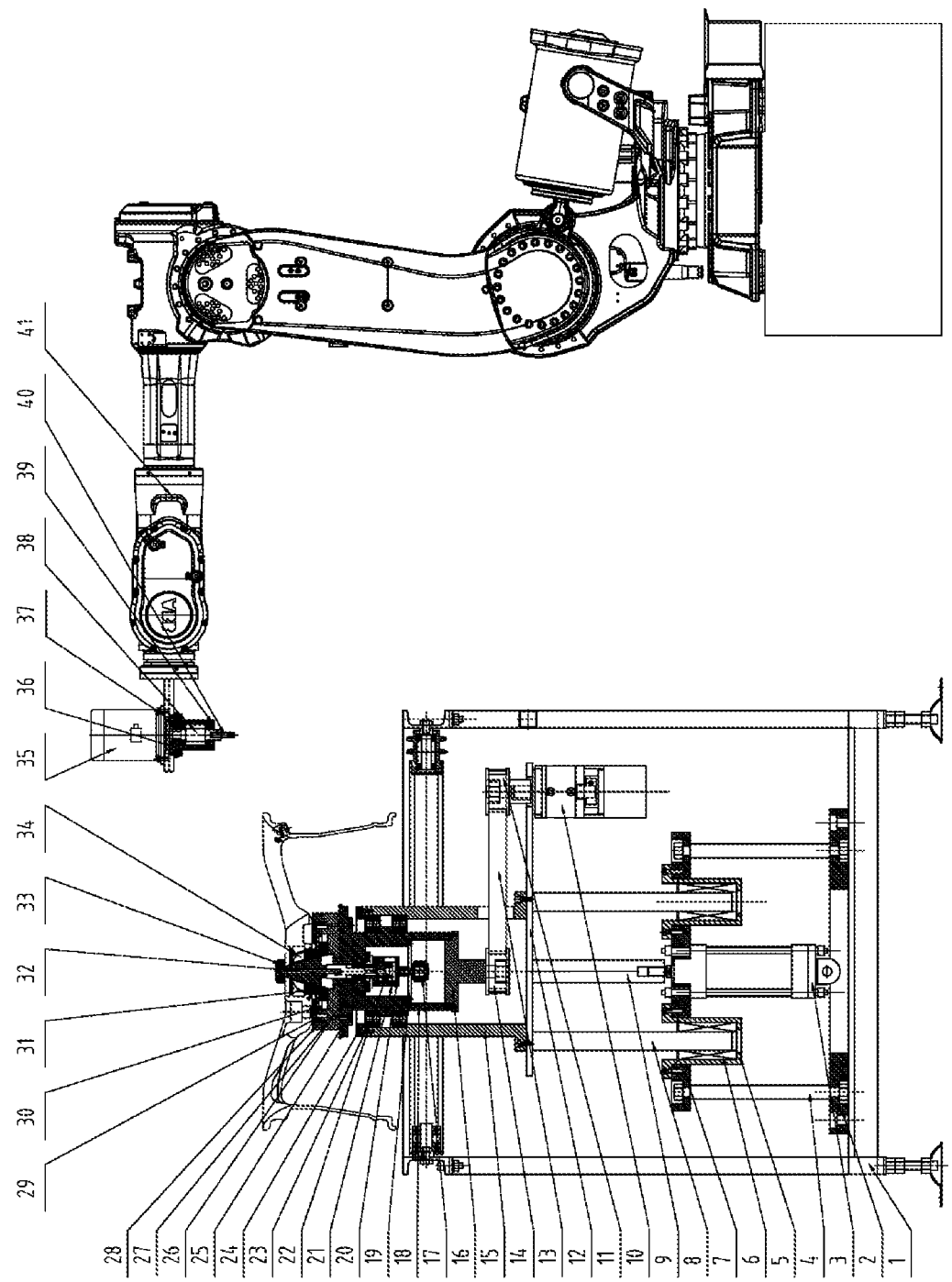
FIG. 1 is a structure diagram of a device for milling wheel window burrs on line according to the present disclosure.
Figure 2A:
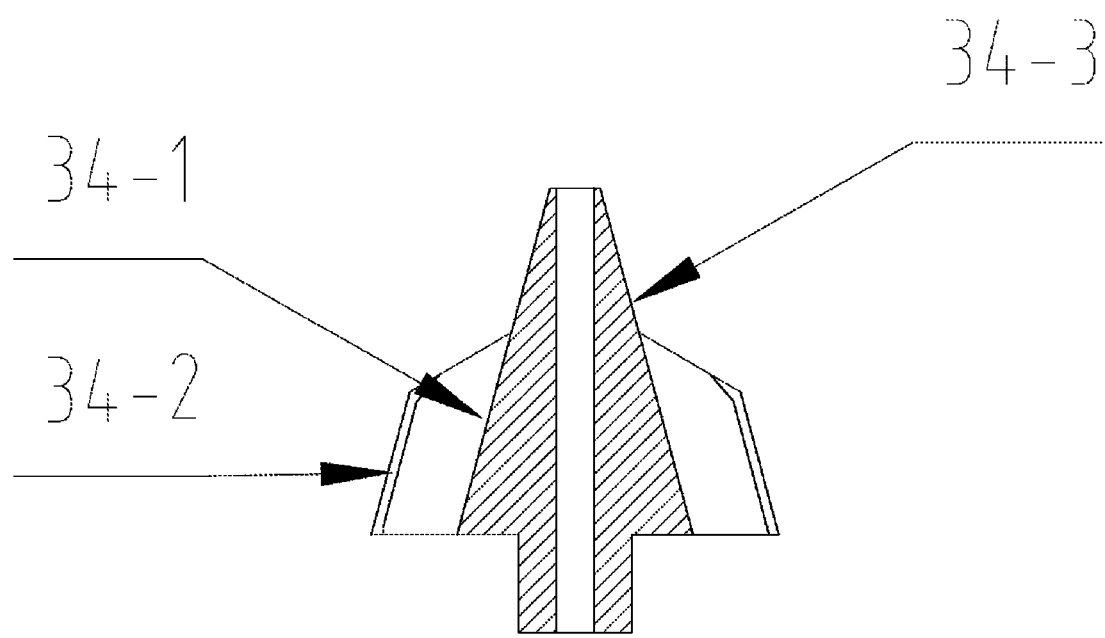
Figure 2B:
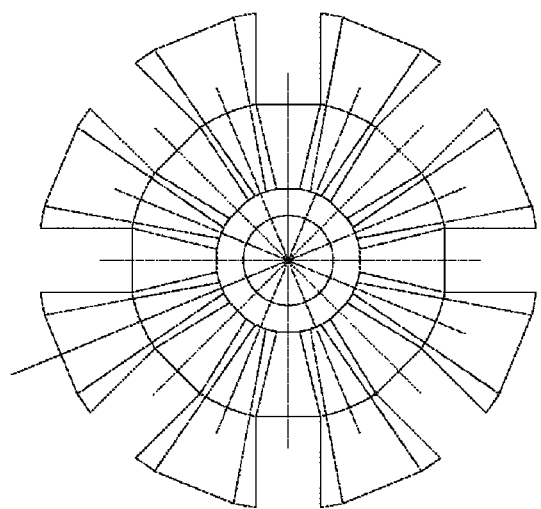

1—frame, 2—base plate, 3—lifting cylinder, 4—first bracket, 5—bearing base, 6—linear bearing, 7—mounting plate, 8—guide shaft, 9—lifting shaft, 10—first servo motor, 11—first synchronous pulley, 12—connecting plate, 13—synchronous belt, 14—second synchronous pulley, 15—base, 16—first connecting shaft, 17—second servo motor, 18—first shaft sleeve, 19—lower end cover, 20—second connecting shaft, 21—second shaft sleeve, 22—cylinder, 23—first bearing, 24—end cover, 25—first gland, 26—second bearing, 27—base plate, 28—flange plate, 29—pin, 30—spring, 31—expansion flap, 32—third connecting shaft, 33—guard, 34—expansion core, 35—third servo motor, 36—third shaft sleeve, 37—third bearing, 38—rotating shaft, 39—second gland, 40—milling cutter, 41—six-axis manipulator.

DETAILED DESCRIPTION

The details and working conditions of the specific device according to the present disclosure will be described in detail below in combination with the drawings.

The present disclosure relates to a device for milling wheel window burrs on line, which is mainly composed of a frame 1, a base plate 2, a lifting cylinder 3, a first bracket 4, a bearing base 5, a linear bearing 6, a mounting plate 7, a guide shaft 8, a lifting shaft 9, a first servo motor 10, a first synchronous pulley 11, a connecting plate 12, a synchronous belt 13, a second synchronous pulley 14, a base 15, a first connecting shaft 16, a second servo motor 17, a first shaft sleeve 18, a lower end cover 19, a second connecting shaft 20, a second shaft sleeve 21, a cylinder 22, a first bearing 23, an end cover 24, a first gland 25, second bearings 26, a base plate 27, a flange plate 28, pins 29, springs 30, expansion flaps 31, a third connecting shaft 32, a guard 33, an expansion core 34, a third servo motor 35, a third shaft sleeve 36, a third bearing 37, a rotating shaft 38, a second gland 39, a milling cutter 40 and a six-axis manipulator 41.

A lifting portion: the base plate 2 is fixed on the frame 1, the mounting plate 7 is fixed on the base plate 2 via the first bracket 4, the bearing base 5 and the lifting cylinder 3 are fixed on the mounting plate 7, the lifting shaft 9 is mounted on the bearing base 5 via the linear bearing 6, the two ends of the lifting shaft 9 are respectively connected with the connecting plate 12 and an output shaft of the lifting cylinder 3, and the lifting cylinder 3 drives the mounting plate 7 to move up and down smoothly via the linear bearing 6;

A rotating portion: the first servo motor 10 and the base 15 are fixed on the connecting plate 12, the first shaft sleeve 18 is mounted on the base 15 via the first bearing 23 and the end cover 24, the first synchronous pulley 11 and the second synchronous pulley 14 are respectively connected with the first connecting shaft 16 and an output shaft of the first servo motor 10, and the synchronous belt 13 is connected with the first synchronous pulley 11 and the second synchronous pulley 14 respectively;

A clamping expansion portion: the lower end cover 19, the gland 25 and the base plate 27 are fixed on the first shaft sleeve 18, the second servo motor 17 is mounted on the lower end cover 19, the second shaft sleeve 21 is mounted on the first shaft sleeve 18 via two columns of second bearings 26 and the gland 25, the cylinder 22 is fixed inside the second shaft sleeve 21, an output end of the cylinder 22 is connected with the second connecting shaft 32, the second servo motor 17 is connected with the second shaft sleeve 21 via the second connecting shaft 20, the expansion core 34 is connected with the second shaft sleeve 21 via the third connecting shaft 32, the expansion core 34, the third connecting shaft 32 and the second shaft sleeve 21 are circumferentially locked without relative rotation, the third connecting shaft 32 and the second shaft sleeve 21 can move axially relatively, the flange plate 28 is fixed on the base plate 27, eight uniformly distributed T-shaped chutes are formed in the inner cavity of the flange plate 28 and the base plate 27, the bottom surfaces of the eight expansion flaps 31 are T-shaped structures formed respectively in one-to-one correspondence with the eight T-shaped chutes, the expansion flaps 31 can smoothly and accurately slide in the chutes, the inner side walls of the expansion flaps 31 are 15° inclined surfaces, and the two ends of the eight springs 30 are respectively connected with the flange plate 28 and the eight expansion flaps 31; the lateral surface of the expansion core 34 comprises two groups of inclined surfaces 34-1 and 34-2 uniformly spaced 15°, the number of each group of inclined surfaces is 8, the two inclined surfaces have a height difference, and the upper side walls of the two groups of inclined surfaces are intersected at tapered surfaces 34-3; when the expansion core 34 is at the bottom under the co-action of the pulling force of the cylinder 22 and the elasticity of the springs 30, the side walls of the expansion flaps 31 are in contact with the tapered surfaces 34-3 of the expansion core 34; the second servo motor 17 drives the expansion core 34 to rotate 22.5° via the second connecting shaft 20, the second shaft sleeve 21 and the third connecting shaft 32, and the expansion flaps 31 matched with the inclined surfaces can be switched between the inclined surfaces 34-1 and 34-2 of the expansion core 34. The cylinder 22 drives the third connecting shaft 32 and the expansion core 34 to move up and down, the eight expansion flaps 31 move synchronously centripetally and centrifugally in the eight uniformly distributed T-shaped chutes formed in the inner cavity of the flange plate 28 and the base plate 27 through the cooperation of the inclined surfaces of the expansion flaps 31 and the inclined surfaces of the expansion core 34, and the eight expansion flaps 31 realize high-precision synchronous expansion and contraction functions; since the two groups of inclined surfaces spaced uniformly on the lateral surfaces of the expansion core 34 have a height difference, when the second servo motor 17 drives the expansion core 34 to rotate 22.5°, the expansion flaps 31 matched with the inclined surfaces are switched between the inclined surfaces 34-1 and 34-2 of the expansion core 34, thus, the expansion and contraction diameters of the expansion flaps 31 change in two different ranges, and eventually the expansion flaps 31 achieve large-stroke expansion and contraction;

A milling portion: the third servo motor 35 and the third shaft sleeve 36 are fixed on the six-axis manipulator 41, the second gland 39 and the third bearing 37 enclose the rotating shaft 38 inside the third shaft sleeve 36, the third servo motor 35 is connected with the rotating shaft 38, and the milling cutter 40 is fixed on the rotating shaft 38.

The base plate 27 and the flange plate 28 are provided with corresponding pin holes, and the locating pins 29 are respectively connected with the pin holes of the base plate 27 and the flange plate 28 to ensure the assembly precision of the base plate 27 and the flange plate 28.

In actual use, a wheel is transported to the working position of the device via a roller bed, compressed air is introduced, the lifting cylinder 3 drives the clamping mechanism to rise, the flange surface of the wheel is in contact with the flange plate 28, and then the lifting cylinder 3 drives the wheel to a designated position. A cylinder rod of the cylinder 22 is in a contracted state, and under the action of the springs 30, the inclined surfaces of the expansion flaps 31 are in contact with the upper tapered surfaces of the expansion core 34. According to the diameter of the center hole of the wheel, the first servo motor 10 drives the expansion core 34 to rotate a specific angle, so that the inclined surfaces of the expansion flaps 31 are matched with the corresponding inclined surfaces of the expansion core 34; then the cylinder 22 starts to work, and the cylinder 22 overcomes the elasticity of the springs 30 and drives the second connecting shaft 20 and the expansion core 34 to move up; and the inclined surfaces of the expansion flaps 31 are matched with the inclined surfaces of the expansion core 34, the expansion flaps 31 move synchronously outward in the eight uniformly distributed T-shaped chutes formed in the inner cavity of the flange plate 28 and the base plate 27, finally, the expansion flaps 31 contact the center hole of the wheel, and the positioning and expansion process of the wheel is completed. The third servo motor 35 drives the milling cutter 40 to rotate, and removes burrs along the edge of the wheel window according to a program previously input to the six-axis manipulator 41. So far, the removal of the wheel burrs is completed.

The invention claimed is:
1. A device for milling wheel window burrs on a production line, comprising a frame, a first base plate, a lifting cylinder, a first bracket, a bearing base, a linear bearing, a mounting plate, a guide shaft, a lifting shaft, a first servo motor, a first synchronous pulley, a connecting plate, a synchronous belt, a second synchronous pulley, a base, a first connecting shaft, a second servo motor, a first shaft sleeve, a lower end cover, a second connecting shaft, a second shaft sleeve, a cylinder, a first bearing, an end cover, a first gland, second bearings, a second base plate, a flange plate, pins, eight springs, eight expansion flaps, a third connecting shaft, a guard, an expansion core, a third servo motor, a third shaft sleeve, a third bearing, a rotating shaft, a second gland, a milling cutter and a six-axis manipulator, wherein the device further comprises:
a lifting portion, in which the first base plate is fixed on the frame, the mounting plate is fixed on the first base plate via the first bracket, the bearing base and the lifting cylinder are fixed on the mounting plate, the lifting shaft is mounted on the bearing base via the linear bearing, two ends of the lifting shaft are respectively connected with the connecting plate and an output shaft of the lifting cylinder, and the lifting cylinder drives the mounting plate to move up and down via the linear bearing;
a rotating portion, in which the first servo motor and the base are fixed on the connecting plate, the first shaft sleeve is mounted on the base via the first bearing and the end cover, the first synchronous pulley and the second synchronous pulley are respectively connected with the first connecting shaft and an output shaft of the first servo motor, and the synchronous belt is connected with the first synchronous pulley and the second synchronous pulley respectively;
a clamping expansion portion, in which the lower end cover, the first gland and the second base plate are fixed on the first shaft sleeve, the second servo motor is mounted on the lower end cover, the second shaft sleeve is mounted on the first shaft sleeve via two columns of the second bearings and the first gland, the cylinder is fixed inside the second shaft sleeve, an output end of the cylinder is connected with the second connecting shaft, the second servo motor is connected with the second shaft sleeve via the second connecting shaft, the expansion core is connected with the second shaft sleeve via the third connecting shaft, the expansion core, the third connecting shaft and the second shaft sleeve are circumferentially locked without relative rotation, the third connecting shaft and the second shaft sleeve are movable axially relative to each other, the flange plate is fixed on the second base plate, eight uniformly distributed T-shaped chutes are formed in an inner cavity of the flange plate and the second base plate, bottom surfaces of the eight expansion flaps are T-shaped structures formed respectively in one-to-one correspondence with the eight uniformly distributed T-shaped chutes, each of the eight expansion flaps is slideable in a respective one of the eight uniformly distributed T-shaped chutes, an inner side wall of each expansion flap of the eight expansion flaps is inclined at 15° relative to an axis of the expansion flap, and two ends of the eight springs are respectively connected with the flange plate and the eight expansion flaps; a lateral surface of the expansion core comprises a first and second groups of inclined surfaces, each of the first and second groups of inclined surfaces is inclined at 15° relative to an axis of the expansion core, the first and second groups of inclined surfaces are uniformly spaced in a circumferential direction of the expansion core, the number of each group of inclined surfaces is 8, the first and second groups of inclined surfaces have a height difference, and the upper side walls of the first and second groups of inclined surfaces are intersected at tapered surfaces; when the expansion core is at a bottom under co-action of a pulling force of the cylinder and the elasticity of the eight springs, side walls of the eight expansion flaps are in contact with the tapered surfaces of the expansion core; the second servo motor drives the expansion core to rotate 22.5° via the second connecting shaft, the second shaft sleeve and the third connecting shaft, inclined surfaces matched with the eight expansion flaps are switched between the first and second groups of inclined surfaces of the expansion core; the cylinder drives the third connecting shaft and the expansion core to move up and down, the eight expansion flaps move synchronously centripetally and centrifugally in the eight uniformly distributed T-shaped chutes formed in the inner cavity of the flange plate and the second base plate through cooperation of the inner side walls of the eight expansion flaps and the first and second groups of inclined surfaces of the expansion core, and the eight expansion flaps realize synchronous expansion and contraction functions; since the first and second groups of inclined surfaces spaced uniformly on the lateral surface of the expansion core have the height difference, when the second servo motor drives the expansion core to rotate 22.5°, the inclined surfaces matched with the eight expansion flaps are switched between the first and second groups of inclined surfaces of the expansion core, thus, expansion and contraction diameters of the eight expansion flaps change in two different ranges; and a milling portion, in which the third servo motor and the third shaft sleeve are fixed on the six-axis manipulator, the second gland and the third bearing enclose the rotating shaft inside the third shaft sleeve, the third servo motor is connected with the rotating shaft, and the milling cutter is fixed on the rotating shaft.

2. The device for milling wheel window burrs on a production line according to claim 1, wherein the second base plate and the flange plate are provided with corresponding pin holes, and the pins are respectively connected with the pin holes of the second base plate.

* * * * *